Sept. 8, 1925.
W. H. ROUSSEL
1,553,185
EGG PROCESSING
Filed May 24, 1923
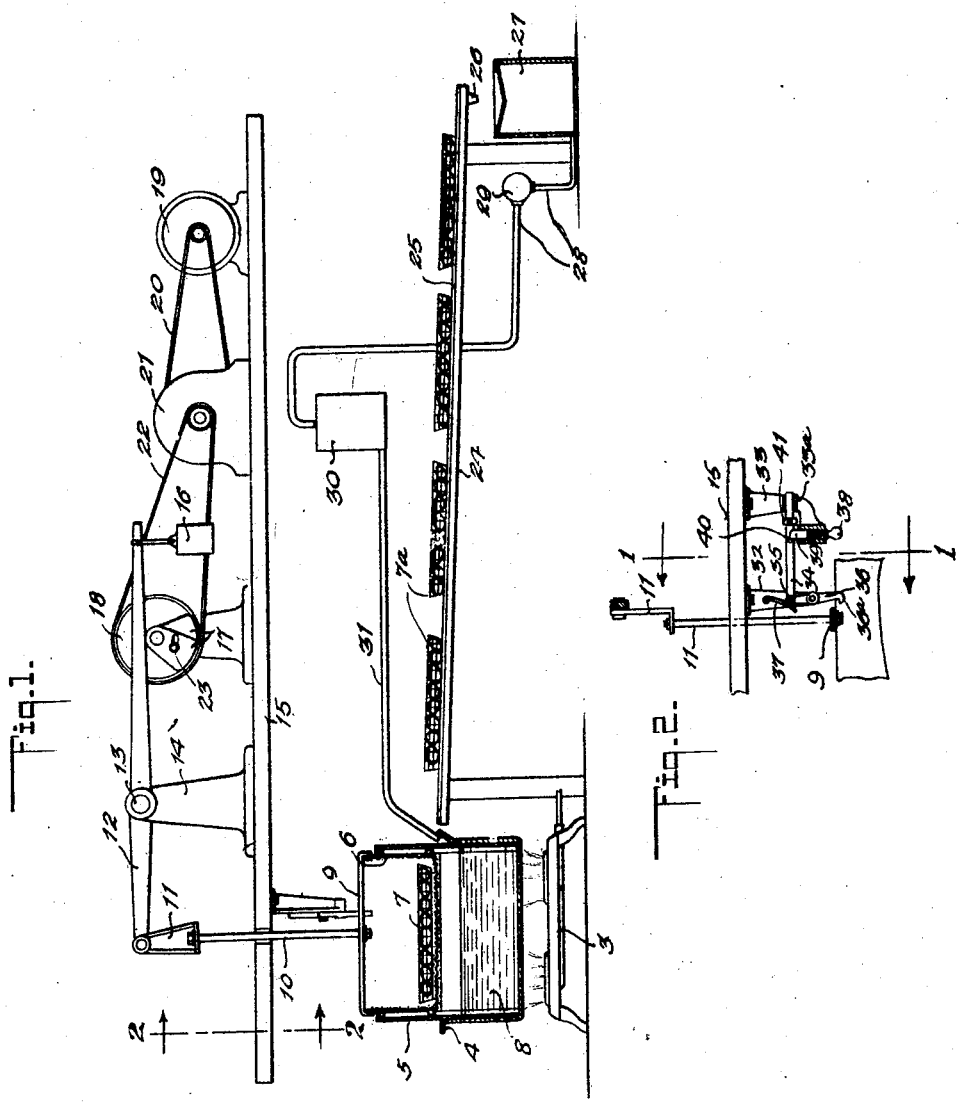
WITNESSES
INVENTOR
W. H. ROUSSEL
BY
ATTORNEYS Patented Sept. 8, 1925.

1,553,185

UNITED STATES PATENT OFFICE.

WILLIAM H. ROUSSEL, OF SAN FRANCISCO, CALIFORNIA.

EGG PROCESSING.

Application filed May 24, 1923. Serial No. 641,174.

*To all whom it may concern:*

Be it known that I, WILLIAM H. ROUSSEL, a citizen of the United States, and a resident of San Francisco, in the county of San Francisco and State of California, have invented new and useful Improvements in Egg Processing, of which the following is a full, clear, and exact description.

This invention relates to processing eggs, to preserve the same, and has for an object to provide a new and improved apparatus adapted particularly for use to facilitate a carrying out of the processing.

According to my invention, the eggs to be processed are submerged for a short interval of time beneath the surface of a bath of preferably heated oil, and then removed therefrom and set on a suitable support where surplus oil is removed, not as the result of any particular temperature application, but primarily as the result of a dripping off of such surplus oil.

More than this, the present invention involves maintaining the bath of oil at about the level required, but primarily by employing the oil drippings to replenish the main bath. This minimizes loss of oil, and increases the extremely low expense of the method.

Best to obtain the advantages of the present invention, I provide improved egg processing apparatus, comprising essentially, but in addition to various improvements preferred to be incorporated, the combination of a receptacle containing oil or other suitable liquid, a carrier, as a foraminous cage, for a plurality of eggs, which carrier is movable relative to said liquid to immerse therein the collection eggs in the carrier and then further movable relative to the liquid to remove such eggs therefrom, and means for periodically and alternately giving the carrier such two movements.

The various features of the invention and the advantages inherent, as also various objects sought to be attained other than those indicated above, will be in part specifically pointed out and in part indicated hereinafter.

The invention will thus be best understood from a consideration of the following detailed description when taken in connection with the accompanying drawings forming part of this specification; with the understanding, however, that such drawing illustrates, merely by way of example, some possible embodiments of the invention, and that the invention is not confined to any strict conformity with the showing in the drawing, but may be changed and modified so long as such changes and modifications mark no material departure from the salient features of the invention as expressed in the appended claims.

In said drawing,

Fig. 1 is a side elevation, partially in section, showing an embodiment of the preferred apparatus; and also illustrating the processing; and Fig. 2 is a fragmentary view, being a transverse section taken on line 2—2 of Fig. 1.

Referring now to the details of the drawing, at 3 is represented a heater, as a gas heater, and at 4 an oil pan or receptacle for any suitable material adapted to be heated or heated and vaporized for processing eggs to prolong their period of safe preservation before consumption.

Guided for vertical travel up and down in a suitably shaped structure 5 is an elevator cage or basket 6 of foraminous material adapted to carry on its floor a removable egg-holding tray 7 of similar material. The cage is intended to be moved up and down in shaft 5 for vertical travel the lowermost limit of which will submerge the tray 7 and its eggs below the surface of the heated oil 8.

The following means, a power operated means in the present instance, is provided for periodically raising and lowering cage 7: The cage carries a cross strap or flat bail 9, forming, with a rod 10 and a loose hung link 11, a suspending connection for the cage from a lever of the first class or walking beam 12, pivoted at 13 on a standard 14 on a suitable shelf or flooring 15. This beam is normally urged to the position shown in Fig. 1 by a weight 16; but is locked against this weight, to move the cage 6 up and down intermittently, yet always with a pause of quiescence at the bottom of its path of travel, to dip its tray of eggs in oil 8 for a suitable interval, by means of a cam 17 fixed on a pulley 18 driven continuously by an electric motor 19, through a belt 20 from the motor to a power intake pulley (not shown) of a reduction gearing in a gear case 21 and a belt 22 from the power output pulley of said gearing to pulley 18.

In order to provide means for precisely and nicely adjusting said period of prolonged dip in the oil 8 on each downward trip of the cage during a continuous run on a batch of eggs to be processed, the cam 17, it will be observed, includes a plurality of cam-plates, one of which, that one to the right of Fig. 1, is fixed on and preferably cast integral with pulley 18, and the other of which is loosely pivotally mounted on the pulley shaft so that said plate may be variously overlappingly arranged relative to the first-mentioned plate. A setting means for fixing the plates in any desired adjustment is provided in the shape of a slot and set-screw instrumentality conventionally indicated at 23 in Fig. 1.

It will be understood that each time the cage rises, a new tray of eggs is to be substituted.

The purpose of the reduction gearing in case 21, which may be provided with well-known (but not shown) change speed appurtenances, is to employ an electrical motor as the economical source of power drive, and yet for causing the cage 6 to travel at such a comparatively slow rate of speed as to permit the tray of processed eggs to be removed therefrom by an attendant and placed at the upper end of the column of trays 7ª of previously treated eggs on an inclined drip table 24, and another tray of eggs to be processed to be substituted in the cage. Such slow speed of movement of the cage need not be very slow, since the weight 16 will hold the cage quiescent at the top of each of its strokes for the major portion of the time of revolution of pulley 18 occurring with that stroke, even when cam 17 is set to its maximum length of cam-surface.

The table 24 may be of any suitable construction, as one provided with spaced longitudinal tracks 25 along the tops of which are slid the bottoms of the trays 7ª, so that oil dripping from the eggs may flow down to and be discharged through a drip-spout 26.

These oil drippings from spout 26 fall into a receptacle 27. Such receptacle, especially when replenished with additional oil at regular intervals based on the speed of movement of the elevator and hence on the number of eggs treated per time unit of operation, is thus the source of supply, by way of a conduit 28 and a suitably driven pump 29, for an oil tank 30 serving the pan 4. This tank 30 is so positioned as to deliver its oil by gravity, through a downwardly inclined pipe 31, to the lipped side of pan 4 as shown. By this arrangement, the oil is repeatedly used, and the liquid level of the collection of oil in the pan 4 is always kept at that required, and without the necessity of overflow drains, collection means for such overflow drains, etc. A suitable strainer (not shown) is placed in the path of the oil discharged into tank 30 from the upper end of conduit 28, to segregate out particles of dirt and other collected impurities in the oil from receptacle 27.

Referring now particularly to Fig. 2, the following means are provided to permit cage 6 to be stopped instantaneously by the attendant, to prevent a re-dipping of the same tray of eggs, whenever anything goes wrong or is apparently about to go wrong with the apparatus: Hung from flooring 15 are brackets 32 and 33, the latter of which carries a horizontal boss 33ª loosely mounting a horizontal slide rod 34 of rectangular cross-section. This rod is joined at 35 by a pin and slot connection (not shown) to the upper end of a latch lever 36 on bracket 32. This lever has a hook 36ª at its lower end. Such hook is normally held as shown in Fig. 2, that is, out of the way of bail 9 by a leaf spring 37 on bracket 32. Whenever trouble occurs or seems about to occur in the working of the apparatus while cage 6 is above oil 8, the attendant has only to pull down on a knob 38, thereby to lower its topmost and spring-upheld dog portion 39, whereupon such dog releases a detent pin 40 on slide rod 34, with the result that hook 36ª is snapped into position to catch and detain the cage by way of the latter's bail at about the instant a stop-block 41 on the slide rod abuts boss 33ª. As a result the cage will be halted at or near the top of its path of travel, even though beam 12 continues to rock,—until a pull to the left of Fig. 2 on the lower arm of lever 36 releases hook 36ª from the cage bail, and thereupon dog 39 again latches behind pin 40.

What has thus just been described is the apparatus preferred to be used, to facilitate a carrying out of the processing.

Such processing, it will have been seen, has various aspects, as follows:

Thus, in one aspect, the process involves the subjection of an egg to be preserved to submersion in oil, and preferably in oil which is heated. In this connection, the temperture of the oil in the pan 4 is preferably kept in the neighborhood of 212° F., but, so far as the process has been practiced, never quite at and certainly not above such temperature.

Further, the invention, considered as furnishing a process, involves the immersion at one step of a plurality of eggs, and the handling of the eggs after leaving the oil and the oil vapors above the latter, such that the eggshells are gradually drained of their oil coatings. And in this connection, the process further involves such a handling of the eggs whereby to facilitate the carrying out of another feature of the process, to wit, the utilization of the oil drippings to replenish what may be termed a main source of oil supply (the receptacle 27), and in such a way that practice will soon tell at what intervals and at what amounts definite extra quantities of oil need be added to the system to maintain the collection of oil 8 at about the proper level, entirely without employing float-actuated valves or the like in the oil feed line for the pan 4, overflow drains, or the like.

As heretofore indicated, variations in the apparatus of the present invention may be resorted to within the scope of the following claims.

I claim:

1. In egg processing apparatus, the combination of a receptacle adapted to contain a processing liquid, a carrier adapted to contain a plurality of eggs, and vertically movable relatively in one direction to said receptacle, first to immerse the eggs in said liquid and then movable in the opposite direction to remove the eggs from the liquid, means for periodically and alternately imparting such movements, means for maintaining said carrier in a period of quiescence at the bottom of its path of travel, means for automatically holding the carrier predeterminedly at the end of each such movement and wherein one of said holding means includes adjustable cam sections.

2. In egg processing apparatus, the combination of a receptacle adapted to contain a processing liquid, a carrier adapted to contain a plurality of eggs, and vertically movable relatively in one direction to said receptacle first to immerse the eggs in said liquid, and then movable in the opposite direction to remove the eggs from the liquid, means for periodically and alternately imparting such movements, means for maintaining said carrier in a period of quiescence at the bottom of its path of travel, said egg carrier being power operated, and manually operable means for halting the carrier without stopping operation of said power operated means.

WILLIAM H. ROUSSEL.